United States Patent [19]

Stahly

[11] Patent Number: 4,978,060
[45] Date of Patent: Dec. 18, 1990

[54] ENGINE COOLANT THERMOSTAT WITH PRESSURE RELIEF FEATURE

[75] Inventor: Daniel C. Stahly, Elmhurst, Ill.
[73] Assignee: Eaton Corporation, Cleveland, Ohio
[21] Appl. No.: 494,199
[22] Filed: Mar. 15, 1990
[51] Int. Cl.[5] ............................................. F01P 7/02
[52] U.S. Cl. .................................. 236/34.5; 236/92 C
[58] Field of Search ................. 123/41.08, 41.09, 41.1; 236/34.5, 92 R, 92 C, 34

[56] References Cited

U.S. PATENT DOCUMENTS

| | | | |
|---|---|---|---|
| 2,400,615 | 5/1946 | Warrick et al. | 236/34.5 |
| 2,770,440 | 11/1956 | Woods | 236/34 |
| 3,918,418 | 11/1975 | Horn | 123/41.08 |
| 4,344,564 | 8/1982 | Magnuson | 236/34.5 |
| 4,426,036 | 1/1984 | Sliger | 236/34.5 |

Primary Examiner—Noah P. Kamen
Attorney, Agent, or Firm—R. A. Johnston

[57] ABSTRACT

An engine coolant thermostat having an annular mounting member with the poppet seat and outer peripheral mounting flange covered with a unitary elastomer cover. A thermally responsive actuator means with a movable output force member is registered against a mounting bracket extending from the mounting member. Rod means is slidably received through the poppet and upon a calibrated lost motion movement of the output force member effects opening of the poppet. A spring biases the poppet closed and is overcome at a predetermined coolant pressure to permit the poppet to open as a pressure relief valve.

12 Claims, 2 Drawing Sheets

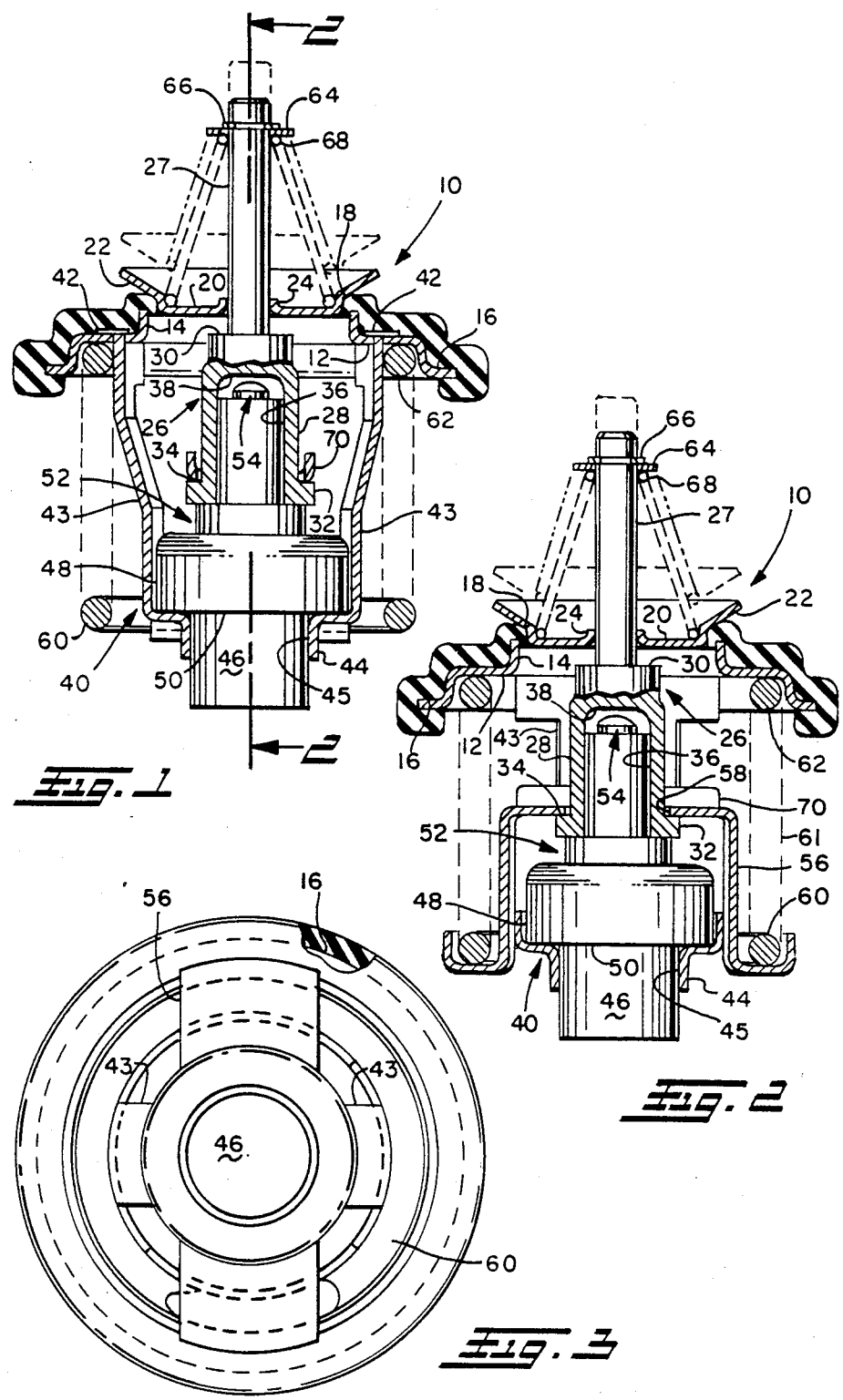

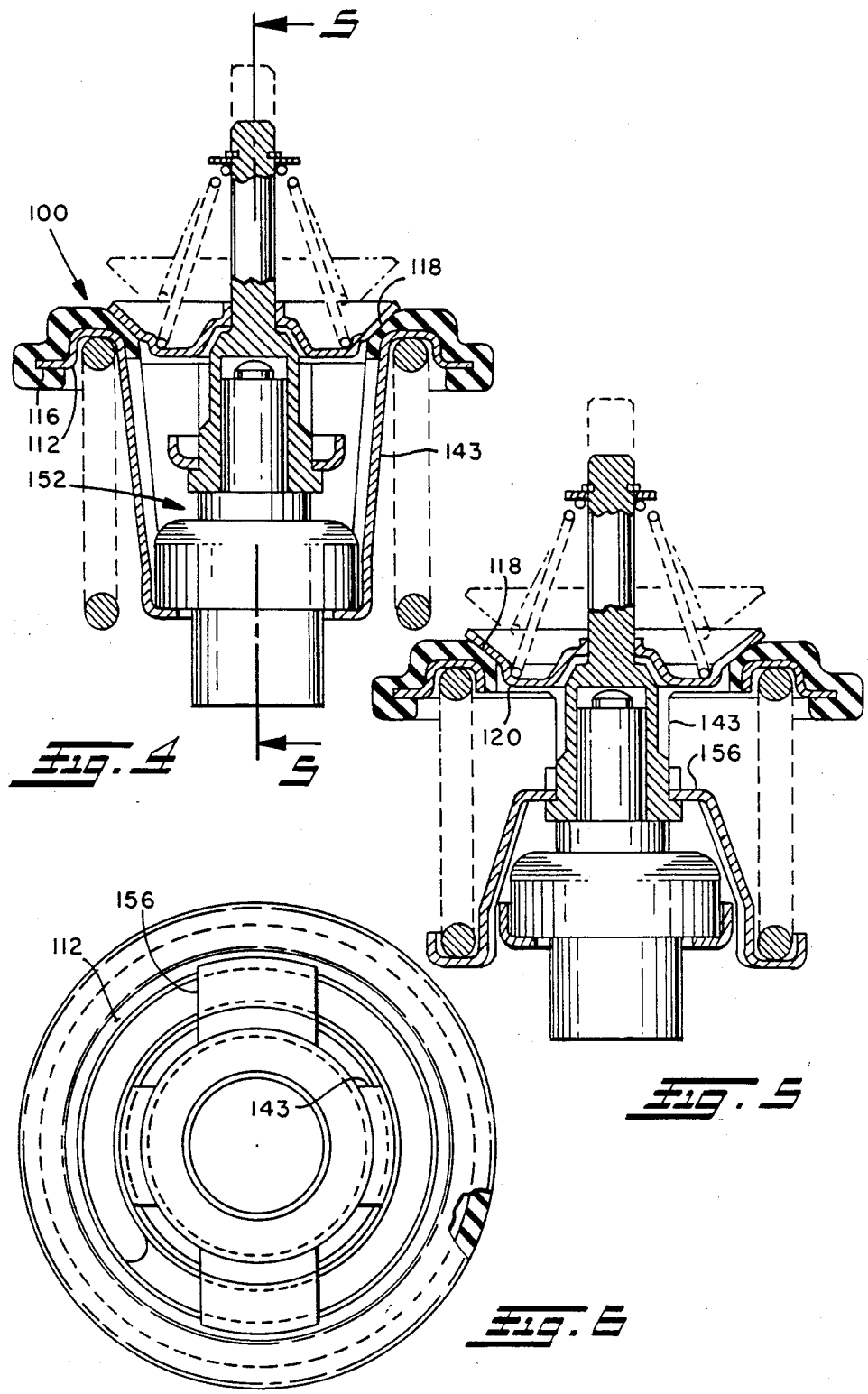

ENGINE COOLANT THERMOSTAT WITH PRESSURE RELIEF FEATURE

BACKGROUND OF THE INVENTION

The present invention relates to thermally actuated valves, or thermostats as they are often referred to, employed in the coolant passages of liquid cooled internal combustion engines for controlling flow of the engine coolant. Typically such thermostats are employed in the water outlet of the cooling passages in an engine cylinder head for controlling flow of coolant to the vehicle radiator.

In marine engine applications, the engine coolant is often sea water taken in by the water pump through a sea cock or inlet port provided below the waterline of the craft in which the engine is employed. Marine engine applications are typically of the open circuit coolant arrangement wherein the coolant is not recirculated through the engine but is discharged in a return port to the sea. In marine engine applications problems have arisen in providing thermostats for controlling the flow of sea water to maintain the desired engine temperature where sea weed and other flotsum have lodged in the thermostat valve seat and poppet and caused the thermostat to malfunction.

In engine applications where failure of the thermal actuator to open the poppet valve would result in rapid overheating and failure of the engine, particularly in heavy duty engine applications such as truck or marine service it has been desired to provide a coolant over-pressure relief function to the thermostat. As the temperature in the engine coolant passages rises above the boiling point of the coolant, it is desired to have the pressure of the water vapor acting over the surface area of the poppet cause the poppet to open and permit circulation of coolant through the engine.

In order to provide effective sealing of the thermostat poppet against its seat in the closed position for providing fast warmup and sealing of the mounting of the thermostat in the engine coolant passage to prevent leakage around the thermostat, it has been desired to provide a resilient material for sealing about the valve seat and the mounting flange of the thermostat. It has further been desired to provide a low cost readily manufacturable engine thermostat providing the above-described features in a structure which provides repeatability, reliability and long life in severe engine application such as truck and marine engines.

SUMMARY OF THE INVENTION

The present invention provides an engine thermostat which is economical to manufacture and has a resilient seating surface for the thermally actuated poppet. A mounting member has a peripheral flange with an elastomeric covering thereover for ensuring sealing thereabout when the thermostat is mounted in an engine coolant passage. The poppet is slidably mounted on an actuating rod means to permit lost motion therebetween for enabling temperature calibration after assembly; and, the poppet is biased to the closed position by a conical compression spring having one end anchored to the actuating rod means. The annular mounting flange has bracket means extending therefrom with a thermally responsive actuator mounted thereon and having a movable output member. The thermally responsive actuator, upon experiencing a predetermined amount of lost motion travel set during calibration, causes registration surfaces provided on the rod means to contact the poppet and effect poppet opening.

The conically tapered poppet spring provides a predetermined bias force on the poppet in the closed position and permits the poppet to move to the open position when the engine coolant vapor reaches a predetermined fluid pressure level.

Preferably the elastomeric valve seat and the covering for the mounting flange are formed integrally on the annular mounting member.

In one embodiment the bracket means comprises a strap member staked onto the annular mounting member; and, in another embodiment the bracket means and the annular mounting member are formed integrally.

The present invention thus provides a unique and novel low cost engine thermostat with a poppet slidable on the actuating rod means and spring biased to open when exposed to predetermined engine coolant pressure. The poppet valve seat and annular mounting member peripheral flange are coated with elastomer to provide improved sealing of the poppet and the mounting of the thermostat in the engine coolant passage.

BRIEF DESCRIPTION OF THE DRAWINGS

FIG. 1 is a cross-section of a first embodiment of the invention;

FIG. 2 is a section right-hand view taken along section indicating lines 2—2 of FIG. 1;

FIG. 3 is a bottom view of the embodiment of FIG. 1;

FIG. 4 is a view similar to FIG. 1 of an alternate embodiment of the invention;

FIG. 5 is a right-hand section view taken along section indicating lines 2—2 of FIG. 3; and, FIG. 6 is a bottom view of the embodiment of the embodiment of FIG. 4.

DETAILED DESCRIPTION

Referring to FIGS. 1–3, one embodiment of the invention is shown as the thermally responsive or thermostatic valve assembly indicated generally at 10 and has an annular mounting member 12 with the inner periphery thereof formed to an axially extending flange 14. The member 12 has a radially outwardly extending mounting flange 16 provided about the outer periphery thereof. The inner peripheral flange 14 is provided with a covering of resilient preferably elastomeric material to provide a tapered valve seating surface 18. The outer flange 16 is also covered with elastomeric material which, in the presently preferred practice is formed integrally with the valve seat 18.

A poppet 20 having a generally annular configuration has the outer periphery thereof formed in a preferably conically tapered valve seating surface 22. Poppet 20 has an axially upwardly turned flange 24 provided about the inner periphery thereof; and, an actuator rod means indicated generally at 26 as an upwardly extending small diameter portion 28 thereof extending upwardly through the bore of flange 24 in closely fitting freely sliding engagement therewith.

The rod means 26 has an enlarged diameter portion 28 provided on the lower end thereof extending downwardly from the poppet. A shoulder or ledge 30 is formed with the smaller diameter portion 26 which ledge 30 makes contact with the undersurface of poppet 20 upon upward movement of the rod means 26 as will hereinafter be described in greater detail. The enlarged diameter portion 28 of the rod means 26 has a radially outwardly extending flange 32 provided at the lower end thereof which forms a shoulder 34 with the enlarged diameter portion 28. The lower end of rod means 26 has a recess in the form of blind bore 36 formed therein which has the blind end thereof formed in generally flat configuration as denoted by reference numeral 38 in the drawings.

Bracket means indicated generally at 40 is provided in the form of a generally U-shaped strap with the upper ends of sides or legs 43 thereof attached to the annular mounting member 12 by any suitable expedient as for example tabs passing through the annular member 12 and deformed thereover, such as by staking, as indicated by reference numeral 42 in the drawings.

The lower end of the bracket means 40 has an aperture 45 provided therein with a downwardly extending flange 44 formed thereabout. The body 46 of a thermal actuator indicated generally at 52 is received in the aperture 45 in closely fitting engagement. The body 46 of the thermal actuator has a radially outwardly extending flange portion 48 which is registered against the bottom of the U-shaped bracket means 40 with the undersurface 50 of flange 48 in contact therewith. The thermal actuator 52 has a movable piston 54 extending upwardly from body 46; and, the upper end of piston 54 is spaced closely adjacent the blind end 38 of bore 36 at room temperature for contact therewith upon the actuator means 52 experiencing elevated temperatures. The piston 54 is shown in the drawings in the room temperature state; and, it will be understood that at normal engine coolant operating temperatures on the order of 90 degrees C.-104 degrees C. the piston will be moved vertically upward to contact the surface 38.

It will be understood that the thermal actuator means 52 has provided in the body 46 a thermally expending medium suitable for driving the piston 44 upward a desired distance at a given temperature. Thermal actuators of this type are well known in the art and may typically employ a wax material embedded with thermally conductive copper flakes wherein the wax material undergoes a substantial expension in a narrow temperature range, transforming from a solid to a liquid state during such expension.

Referring to FIGS. 1, and 3, a generally U-shaped retainer strap 56 has an aperture 58 formed in the closed end thereof with the large diameter 28 of rod means 26 received through the aperture 58 with the shoulder 34 of rod means flange 32 resting against the underside of the strap 56. The region of the U-shaped strap 56 about aperture 58 is stiffened by upturned knobs or flanges 70, disposed on opposite sides of the enlarged diameter 28 of the rod means 26. The open ends of the strap 56 are cupped and have the lower end coil 60 of a suitable compression spring 61 registered thereagainst with the upper end coil 62 of the spring registered against the undersurface of mounting member 12. The spring 61 urges the strap 56 downwardly to maintain the shoulder 34 of the flange 32 against the thermal actuator 52 and the thermal actuator against the bracket means 40.

The upper end of small diamter portion 27 of rod means 26 has a washer 64 received thereover and retained thereon by a suitable snap ring 66 received in a groove provided in the rod adjacent the upper end thereof.

The upper end coil of a conically tapered coil sprng 64 is received over the rod portion 27 and registered against the undersurface of washer 64 with the larger diameter lower end coil of the spring 68 registered against the upper surface of poppet 12. The spring 68 is operative to bias the poppet downwardly and in contact with the valve seat 18 at temperatures below the calibrated opening temperature of the thermal actuator means 52.

In operation, the assembly 10 is mounted in a coolant passage in an engine and sealed about the elastomeric material disposed over the outer flange 16 in a manner well known in the art. In the cold engine condition, the thermal actuator means 52 has the piston 54 retracted to the position shown in solid outline in the drawings and similarly the rod means and poppet are in the downwardmost position as shown in solid outline in the drawings. In the position shown in the drawings, the poppet 20 is biased in contact with the valve seat 18 by springs 68. A calibrated distance is provided between the ledge 30 of the rod means and the undersurface of poppet 20. The calibration may be effected, by heating the thermostat to the desired opening temperature and deforming mechanically, as by crimping portions of body 46 to cause the volume of thermally responsive medium to be reduced to force the piston upward to open the poppet 20.

In service, upon the thermal actuator means experiencing engine coolant temperatures above the desired minimum threshold, the piston 54 of the thermal actuator means 52 moves upwardly contacting the surface 38 in the blind bore of rod means 26 and moves the rod means upwardly until ledge 30 contacts the undersurface of poppet 20 and moves the poppet upwardly to the position shown in dashed outline in the drawings.

In the event of malfunction or failure of the thermal actuator means 52, despite the piston 54 and rod means 26 remaining in the downward position shown in solid outline in the drawings, upon suitable fluid pressure acting across the undersurface of poppet 24, the poppet biasing force provided by conical spring 68 will be overcome and the poppet will move upward acting as a pressure relief valve.

Referring now to FIGS. 4, 5 and 6, an alternate embodiment of the thermostat is indicated generally at 100 as having an annular mounting member 112 with a radially outwardly extending outward flange 116 and a valve seat 118 provided on the upper surface thereof about the inner periphery.

The arrangement and operation of the thermostat 100 is generally similar to that of the embodiment of FIGS. 1, 2 and 3; however, the bracket means 143 in the embodiment 100 is formed integrally with the annular mounting member 112.

The embodiment 100 has the valve seat provided about the corner of the inner periphery of the mounting member 112 rather about an upturned flange 14 as in the embodiment of FIGS. 1 through 3. The construction and operation of the thermostat 100 is otherwise similar to that of the assembly 10.

The present invention thus provides a unique and novel low cost engine coolant thermostat having a poppet valve seat and a outward mounting flange provided with a common elastomeric covering to provide for improved sealing of the poppet and the mounting flange. The poppet is slidably mounted on the thermal actuating rod means and is biased to the closed position by a spring having one end thereof anchored to the rod means. The thermal actuator means causes the rod means to undergo a calibrated amount of lost motion before contacting the poppet for movement to the open position upon the thermal actuator means experiencing a desired threshold pressure. The poppet is slidably spring biased on the actuator rod means to the closed position; and, upon experiencing a threshold coolant vapor pressure thereon is moved away from its seat thereby providing an overpressure relief function.

Although the invention has hereinabove been described with respect to the illustrated embodiments, it will be understood that the invention is capable of modification and variation and is limited only by the following claims.

I claim:

1. A combination temperature control and pressure relief valve assembly comprising:
   (a) an annular mounting member having an annular elastomeric valve seat formed thereon about the inner periphery thereof on one axial side thereof, and an elastomeric covered mounting flange about the outer periphery;
   (b) an annular poppet movable between a closed position contacting and a plurality of open positions spaced from said valve seat;
   (c) actuator rod means slidably received through said poppet and extending axially a distance from said valve seat, said rod means defining on the side of said mounting member opposite said valve seat certain surfaces for axial registration against said poppet;
   (d) bracket means extending axially from said mounting member on the side thereof opposite said valve seat;
   (e) thermally responsive actuator means having a reaction surface thereof registered against said bracket means and a force output member thereof disposed for bearing against said rod means for effecting movement thereof and movement of said poppet away from said valve seat;
   (f) first spring means operative to bias said actuator means against said bracket means;
   (g) second spring means biasing said poppet against said valve seat with a predetermined force equivalent to a desired fluid relief pressure acting over the effective area of said poppet such that said poppet moves to one of said plurality of open positions when said fluid relief pressure is exceeded.

2. The valve assembly defined in claim 1, wherein said force output member is operative for bearing against said rod means after a predetermined amount of lost-motion movement.

3. The valve assembly defined in claim 1, wherein said bracket means is formed integrally with said annular mounting member.

4. The valve assembly defined in claim 1, wherein said elastomeric valve seat and said elastomeric cover for said mounting flange are integrally formed.

5. A thermostatically operated valve assembly with over-pressure relief feature adapted for mounting in a coolant passage in a liquid cooled engine comprising:
   (a) an annular mounting member having an elastomeric valve seat formed on one axial side of the inner periphery thereof;
   (b) an annular poppet disposed for movement between an open and closed position with respect to said valve seat;
   (c) mounting bracket means extending from the axial side opposite said one side of said mounting member;
   (d) actuator rod means slidably guided by the inner periphery of said poppet for movement with respect thereto and operative to contact said poppet and effect movement thereof;
   (e) thermally responsive actuator means supported on said bracket means and having an output member operative to forcibly contact said rod means and effect movement of said poppet from the closed to open position;
   (f) first spring means biasing said rod means in a direction to oppose said actuator means output force; and,
   (g) second spring means having one end registered on said rod means and operative to bias said poppet to the closed position with a predetermined force equivalent to a desired fluid relief pressure acting over the effective area of the poppet such that said poppet moves to one of said plurality of open positions when said fluid relief pressure 13 exceeded.

6. The valve assembly defined in claim 5, wherein said second spring means provides a bias such that upon the poppet experiencing a predetermined fluid pressure acting thereon, said bias is overcome and said poppet moves to one of said open positions.

7. The valve assembly defined in claim 5, wherein said actuator means output member undergoes a predetermined amount of lost motion movement before effecting movement of said rod means.

8. The valve assembly defined in claim 5, wherein said annular mounting member includes a radially outwardly extending flange; and, said elastomeric valve seat extends radially outwardly and axially over said flange.

9. An engine coolant thermostat comprising:
   (a) an annular mounting member having a valve seat formed of resilient material disposed about the inner periphery thereof on one axial side thereof and having the outer periphery adapted for mounting in an engine coolant passage;
   (b) an annular poppet disposed for movement between open and closed positions with respect to said valve seat;
   (c) actuator rod means slidably received through the inner periphery of said annular poppet, said rod means defining thereon certain surfaces for contacting said poppet and effecting movement thereof;
   (d) bracket means extending from said annular mounting member and defining mounting surfaces thereon;
   (e) thermally responsive actuator means mounted on said bracket means mounting surfaces and having an output member movable in response to experienced temperature changes in engine coolant, said output member operative upon a calibrated amount of lost-motion movement to contact said rod means and effect movement of said poppet to an open position;
   (f) means biasing said rod means in a direction opposing said output member movement;
   (g) spring means having one end thereof reacting on said rod means and the other end thereof reacting against said poppet, said spring means urging said poppet to the closed position, said spring means operative to exert a predetermined force on said poppet in the closed position, wherein coolant fluid pressure acting on said poppet is effective to open said poppet at a predetermined pressure.

10. The thermostat defined in claim 9, wherein said annular mounting member has a radially outwardly extending flange about the outer periphery; and, said flange is covered with elastomeric material.

11. The engine thermostat defined in claim 9, wherein said bracket means is formed integrally with said annular mounting member.

12. The engine thermostat defined in claim 9, wherein said annular mounting member has said valve seat and an elastomeric covering for the outer periphery thereof formed integrally of elastomeric material.

* * * * *